United States Patent
Nishiyama et al.

(10) Patent No.: US 11,248,304 B2
(45) Date of Patent: Feb. 15, 2022

(54) TRANSPARENT ELECTRODE FOR OXYGEN PRODUCTION, METHOD FOR PRODUCING SAME, TANDEM WATER DECOMPOSITION REACTION ELECTRODE PROVIDED WITH SAME, AND OXYGEN PRODUCTION DEVICE USING SAME

(71) Applicants: Mitsubishi Chemical Corporation, Chiyoda-ku (JP); THE UNIVERSITY OF TOKYO, Bunkyo-ku (JP); JAPAN TECHNOLOGICAL RESEARCH ASSOCIATION OF ARTIFICIAL PHOTOSYNTHETIC CHEMICAL PROCESS, Chiyoda-ku (JP); NATIONAL INSTITUTE OF ADVANCED INDUSTRIAL SCIENCE AND TECHNOLOGY, Chiyoda-ku (JP)

(72) Inventors: Hiroshi Nishiyama, Bunkyo-ku (JP); Tomohiro Higashi, Bunkyo-ku (JP); Yutaka Sasaki, Bunkyo-ku (JP); Taro Yamada, Bunkyo-ku (JP); Kazunari Domen, Bunkyo-ku (JP); Yohichi Suzuki, Tsukuba (JP); Seiji Akiyama, Chiyoda-ku (JP)

(73) Assignees: Mitsubishi Chemical Corporation, Chiyoda-ku (JP); THE UNIVERSITY OF TOKYO, Bunkyo-ku (JP); JAPAN TECHNOLOGICAL RESEARCH ASSOCIATION OF ARTIFICIAL PHOTOSYNTHETIC CHEMICAL PROCESS, Chiyoda-ku (JP); NATIONAL INSTITUTE OF ADVANCED INDUSTRIAL SCIENCE AND TECHNOLOGY, Chiyoda-ku (JP)

(*) Notice: Subject to any disclaimer, the term of this patent is extended or adjusted under 35 U.S.C. 154(b) by 0 days.

(21) Appl. No.: 16/784,678

(22) Filed: Feb. 7, 2020

(65) Prior Publication Data
US 2020/0173044 A1    Jun. 4, 2020

Related U.S. Application Data

(63) Continuation of application No. PCT/JP2018/029981, filed on Aug. 9, 2018.

(30) Foreign Application Priority Data

Aug. 9, 2017    (JP) .............................. JP2017-154524

(51) Int. Cl.
*C25B 11/075*    (2021.01)
*C01B 21/06*     (2006.01)
(Continued)

(52) U.S. Cl.
CPC ......... *C25B 11/075* (2021.01); *B01J 37/0215* (2013.01); *C01B 21/0617* (2013.01);
(Continued)

(58) Field of Classification Search
CPC ... C25B 11/051; C25B 11/052; C25B 11/054; C25B 11/055; C25B 11/075
See application file for complete search history.

(56) References Cited

U.S. PATENT DOCUMENTS

2003/0074062 A1* 4/2003 Monzyk ................ A61M 1/327
                                                                 623/11.11
2012/0267234 A1   10/2012 Reece et al.
(Continued)

FOREIGN PATENT DOCUMENTS

CN    103534387 A    1/2014
CN    106653936 A    5/2017
(Continued)

OTHER PUBLICATIONS

WO2010119687A1, English translation, Oct. 2010, pp. 1-8 (Year: 2010).*
(Continued)

*Primary Examiner* — Salil Jain
(74) *Attorney, Agent, or Firm* — Oblon, McClelland, Maier & Neustadt, L.L.P.

(57) ABSTRACT

A method for producing a transparent electrode for oxygen production having a Ta nitride layer on a transparent substrate, including: a step of forming a Ta nitride precursor layer on the transparent substrate; and a step of nitriding the Ta nitride precursor layer with a mixed gas containing ammonia and a carrier gas.

4 Claims, 8 Drawing Sheets

(51) Int. Cl.
  *C25B 1/04* (2021.01)
  *C25B 11/057* (2021.01)
  *B01J 37/02* (2006.01)

(52) U.S. Cl.
  CPC .............. *C25B 1/04* (2013.01); *C25B 11/057* (2021.01); *C01P 2006/40* (2013.01); *C01P 2006/60* (2013.01)

(56) References Cited

U.S. PATENT DOCUMENTS

| | | |
|---|---|---|
| 2014/0004435 A1 | 1/2014 | Tamura et al. |
| 2014/0374270 A1 | 12/2014 | Minegishi et al. |
| 2016/0333485 A1 | 11/2016 | Tamura et al. |
| 2017/0130346 A1 | 5/2017 | Sato et al. |
| 2017/0253981 A1* | 9/2017 | Tamura ................ H01G 9/2027 |
| 2017/0362721 A1 | 12/2017 | Domen et al. |
| 2019/0323134 A1 | 10/2019 | Asakura et al. |

FOREIGN PATENT DOCUMENTS

| | | | |
|---|---|---|---|
| JP | 2003-190816 A | 7/2003 | |
| JP | 2008-155111 A | 7/2008 | |
| JP | 2010-189227 A | 9/2010 | |
| JP | 2011-056416 A | 3/2011 | |
| JP | 2011-173102 A | 9/2011 | |
| JP | WO 2013/133338 A1 | 9/2013 | |
| JP | 2017-971 A | 1/2017 | |
| JP | 2017000971 A * | 1/2017 | |
| WO | WO-2010119687 A1 * | 10/2010 | ..... H01L 31/022466 |
| WO | WO 2012/157193 A1 | 11/2012 | |
| WO | WO 2016/024452 A1 | 2/2016 | |
| WO | WO 2016/143704 A1 | 9/2016 | |
| WO | WO 2018/110543 A1 | 6/2018 | |

OTHER PUBLICATIONS

Notification of Transmittal of Translation of the International Preliminary Report on Patentability dated Feb. 20, 2020, in PCT/JP2018/029981, 10 pages.

International Search Report dated Oct. 9, 2018 in PCT/JP2018/029981 filed Aug. 9, 2018, 2 pages.

Miao Zhong, et al., "Highly Active GaN-Stabilized $Ta_3N_5$ Thin-Film Photoanode for Solar Water Oxidation", Angew. Chem. Int. Ed. 2017, vol. 56, pp. 4739-4743.

Hamed Hajibabaei, et al., "Tantalum nitride films integrated with transparent conductive oxide substrates via atomic layer deposition for photoelectrochemical water splitting", Chemical Science, 2016, vol. 7, pp. 6760-6767.

Office Action and Search Report dated Jul. 22, 2021 issued in corresponding Chinese application No. 201880051385.0, with Mechanical Translation, 29 pgs.

\* cited by examiner

TRANSPARENT ELECTRODE FOR OXYGEN PRODUCTION, METHOD FOR PRODUCING SAME, TANDEM WATER DECOMPOSITION REACTION ELECTRODE PROVIDED WITH SAME, AND OXYGEN PRODUCTION DEVICE USING SAME

CROSS-REFERENCE TO RELATED APPLICATION

This is a continuation of International Application PCT/JP2018/029981, filed on Aug. 9, 2018, and designated the U.S., and claims priority from Japanese Patent Application 2017-154524 which was filed on Aug. 9, 2017, the entire contents of which are incorporated herein by reference.

TECHNICAL FIELD

The present invention relates to a transparent electrode for oxygen production, a method for producing the same, a tandem water splitting reaction electrode provided with the transparent electrode for oxygen production, and an oxygen production device using the transparent electrode for oxygen production.

BACKGROUND ART

Since fossil fuels occupying most of the energy resources are limited, research is being conducted on the use of light energy to split water into hydrogen and oxygen. In that case, a photocatalyst is usually used.

One specific form of photocatalyst currently being studied is an electrode for water splitting with cocatalyst supported on the surface of an optical semiconductor such as a conductive oxide, oxynitride, or nitride.

Electrodes for water splitting are composed of an electrode for hydrogen production and an electrode for oxygen production, and an electrode using tantalum nitride ($Ta_3N_5$) as a photocatalyst for oxygen production has been proposed. For example, Non-Patent Document 1 discloses a layered body of a Ta mirror substrate and $Ta_3N_5$ obtained by preparing a tantalum oxide ($TaO_x$) thin film, which is a precursor of tantalum nitride, on a Ta mirror substrate and nitriding the thin film with 100% ammonia gas. In general, a nitriding process using 100% ammonia gas is considered to be convenient because a nitriding reaction proceeds without detailed examination of conditions.

Non-Patent Document 2 discloses a transparent layered body of a quartz substrate and $Ta_3N_5$ obtained by preparing a layered body of a quartz substrate and a transparent conductive film doped with tantalum, depositing an atomic layer of tantalum nitride precursor $Ta(N(CH_3)_2)_5$ on the layered body, and then nitriding the layered body with 100% ammonia gas.

PRIOR ART DOCUMENTS

Non-Patent Document

Non-Patent Document 1: M. Zhong, et al., *Angew. Chem. Int. Ed.*, 2017, 56, 4739-4743
Non-Patent Document 2: H. Hajibabaei, et al., *Chem. Science*, 2016, 7, 6760

SUMMARY OF THE INVENTION

Problem to be Solved by the Invention

Since the layered body using $Ta_3N_5$ disclosed in Non-Patent Document 1 uses a Ta mirror substrate, the layered body cannot be used as a transparent electrode for oxygen production. In a layered body using $Ta_3N_5$ of Non-Patent Document 2 disclosed above, since a precursor film is obtained by atomic deposition, a considerable time is required to obtain a thick $Ta_3N_5$ film, and it is almost impossible to obtain such a thick film industrially. Since a precursor carbon source is mixed during nitriding, the purity of a $Ta_3N_5$ film is low and the transmittance is low.

An object of the present invention is to provide a transparent electrode for oxygen production, which has high transparency and improved electrode performance as compared with a conventional $Ta_3N_5$ electrode.

Means for Solving the Problems

As a result of intensive studies to provide a Ta nitride electrode that is transparent and has high electrode performance, the present inventors have arrived at a desired Ta nitride electrode obtained by nitriding with a mixed gas containing a carrier gas in addition to ammonia in a nitriding process of converting a Ta nitride precursor to Ta nitride. Furthermore, the present inventors have arrived at a desired Ta nitride electrode obtained by providing a nitride semiconductor layer between a Ta nitride precursor and a transparent substrate.

The present invention includes the following aspects.
<1> A method for producing a transparent electrode for oxygen production including a Ta nitride layer on a transparent substrate, including:
a step of forming a Ta nitride precursor layer on the transparent substrate; and
a step of nitriding the Ta nitride precursor layer with a mixed gas containing ammonia and a carrier gas.
<2> The production method according to <1>, wherein the Ta nitride layer is a $Ta_3N_5$ layer.
<3> The production method according to <1> or <2>, wherein the transparent substrate is a sapphire substrate or a $SiO_2$ substrate.
<4> The production method according to any one of <1> to <3>, wherein the carrier gas is nitrogen gas.
<5> A transparent electrode for oxygen production in which a nitride semiconductor layer and a Ta nitride layer are stacked in this order on a transparent substrate.
<6> The transparent electrode for oxygen production according to <5>, wherein the Ta nitride layer is a $Ta_3N_5$ layer.
<7> The transparent electrode for oxygen production according to <5> or <6>, wherein the nitride semiconductor layer is a GaN layer.
<8> The transparent electrode for oxygen production according to any one of <5> to <7>, wherein the transparent substrate is a sapphire substrate or a $SiO_2$ substrate.
<9> The transparent electrode for oxygen production according to any one of <5> to <8>, wherein light transmittance at wavelength of 600 nm to 900 nm is 80% or more.
<10> A method for producing a tandem water splitting reaction electrode, including: a step of stacking a transparent electrode for oxygen production produced by the production method according to any one of <1> to <4> and an electrode for hydrogen production.
<11> A tandem water splitting reaction electrode in which the transparent electrode for oxygen production according to any one of <5> to <9> and an electrode for hydrogen production are stacked.
<12> A transparent electrode for oxygen production containing $Ta_3N_5$ to be used as an oxygen production-side electrode in a water splitting reaction, wherein light transmittance at 600 nm to 900 nm is 80% or more, and photocurrent density at 1.23 $V_{RHE}$ is 3 mA/cm$^2$ or more under AM1.5G irradiation.

<13> A tandem water splitting reaction electrode in which the transparent electrode for oxygen production according to <12> and an electrode for hydrogen production having an absorption peak at a wavelength longer than 600 nm are combined.

<14> A transparent electrode for oxygen production in which a nitride semiconductor layer and a Ti nitride layer are stacked in this order on a transparent substrate.

<15> The transparent electrode for oxygen production according to <14>, wherein the nitride semiconductor layer is a GaN layer.

<16> The transparent electrode for oxygen production according to <14> or <15>, wherein the transparent substrate is a sapphire substrate or a SiO$_2$ substrate.

<17> An oxygen production device including the transparent electrode for oxygen production according to any one of <5> to <9>, <12>, and <14> to <16>.

<18> A water splitting device including the transparent electrode for oxygen production according to any one of <5> to <9>, <12>, and <14> to <16> and/or the tandem water splitting reaction electrode according to <11> or <13>.

<19> A method of synthesizing a compound, including: a step of reacting hydrogen and/or oxygen obtained by splitting water with the water splitting device according to <18>.

<20> The synthesis method according to <19>, wherein the compound is a lower olefin, ammonia, or alcohol.

<21> A synthesis device including the water splitting device according to <18> and a reactor in which a catalyst is arranged, wherein hydrogen obtained from the water splitting device and another raw material are introduced into the reactor and reacted in the reactor.

Advantageous Effects of Invention

According to the present invention, a transparent electrode for oxygen production with high transparency and improved electrode performance over conventional Ta$_3$N$_5$ electrodes can be obtained. Since the transparent electrode for oxygen production provided by the present invention has considerably high electrode performance and high transparency, a tandem water splitting reaction electrode can be formed with an electrode for hydrogen production. Due to such a configuration, it is not necessary to arrange both electrodes in a plane, and therefore, it is possible to split water on an incident light such as sunlight with an efficiency approximately twice that of the case of plain arrangement, and a device using this can be obtained.

As another effect of the present invention, a substrate for a semiconductor device in which a transparent tantalum nitride layer is provided on a transparent substrate can be obtained.

As a further effect of the present invention, a transparent electrode for oxygen production that can utilize sunlight more efficiently among electrodes for oxygen production using Ti nitride can be obtained.

DESCRIPTION OF EMBODIMENTS

Figure 1:
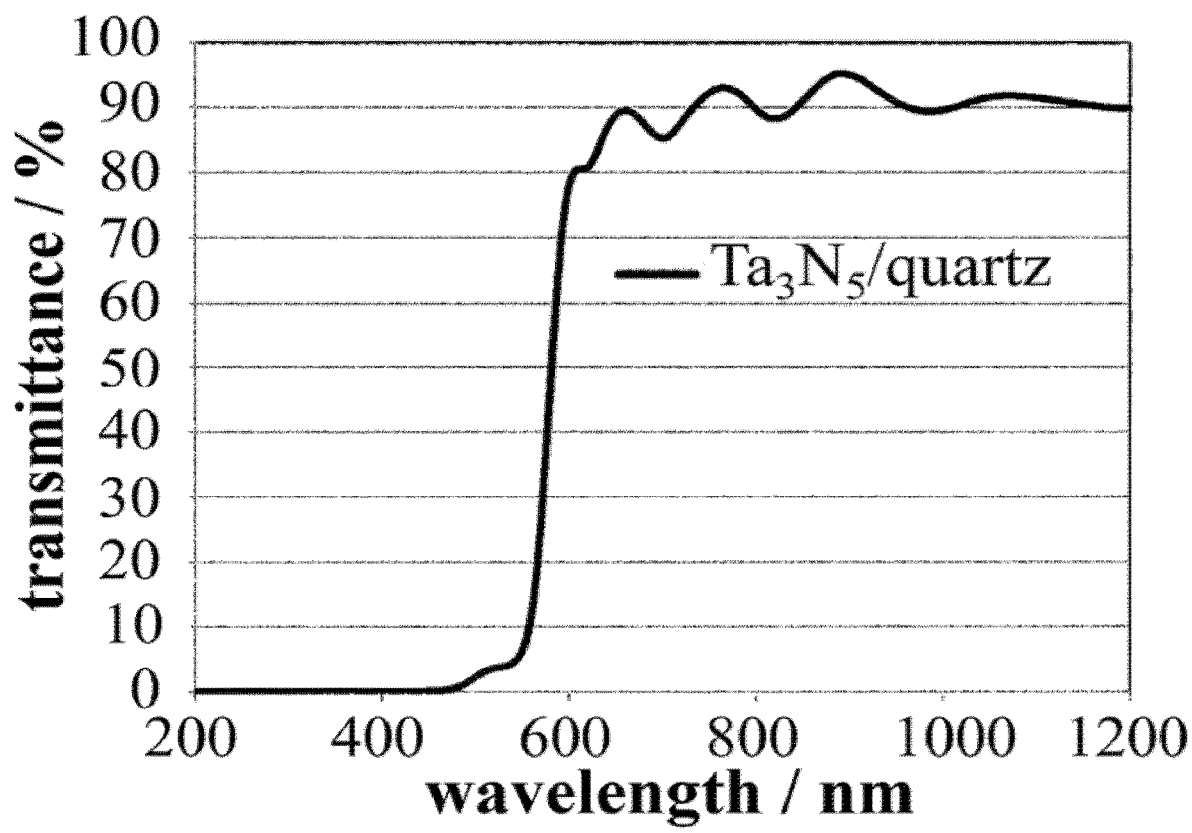
FIG. 1 shows the transmittance at from 600 nm to 900 nm of the transparent photoelectrode prepared in Example 1.

Hereinafter, the present invention will be described in detail. The description of the constituent features described below is an example (representative example) of an embodiment of the present invention, and the present invention is not limited thereto, and various modifications can be made within the scope of the gist thereof.

<Transparent Electrode for Oxygen Production 1>

Hereinafter, a transparent electrode for oxygen production according to a first embodiment of the present invention will be described.

The transparent electrode for oxygen production according to the first embodiment of the present invention is a transparent electrode for oxygen production having a Ta nitride layer on a transparent substrate. A transparent nitride semiconductor layer may be provided between the transparent substrate and the Ta nitride layer.

(Transmittance of Electrode)

The transparent electrode for oxygen production of the present embodiment is transparent. Specifically, the term "transparent" means that light transmittance at wavelength of 600 nm to 900 nm is usually 80% or more, preferably 85% or more, more preferably 90% or more, and still more preferably 95% or more. The upper limit is usually 100%. More preferably, the transmittance is in the above range at wavelength of 600 nm to 1,200 nm. Here, the expression that light transmittance at wavelength of 600 nm to 900 nm is 80% or more means that the average transmittance of light having wavelength of 600 nm to 900 nm is 80% or more, and more preferably, 80% or more at all wavelengths except for a specific point, and most preferably, 80% or more at the point where the transmittance is lowest in the wavelength range of 600 nm to 900 nm.

Since the transparent electrode for oxygen production of the present embodiment has high transparency, it is preferable to use such an electrode in an embodiment of forming a tandem water splitting reaction electrode with an electrode for hydrogen production. By using a tandem type, there is no need to arrange both electrodes in a plane, and therefore, water splitting can be performed with respect to incident light such as sunlight at about twice the efficiency as compared with the case of arrangement in a plane.

(Transparent Substrate)

The transparent substrate used in the present embodiment is a transparent support that supports a Ta nitride layer. Since such a substrate is used as a water splitting electrode, it is preferably an insulating substrate which is chemically stable even in a wide pH range. The transparency of a transparent substrate is preferably the same as the transparency of the above-described transparent electrode, and light transmittance in the entire visible light region may be 80% or more, or may be 90% or more.

The transparent substrate is not particularly limited as long as the substrate is transparent and supports a Ta nitride layer. Specific examples of the material constituting the transparent substrate include $SiO_2$ (quartz), transparent alumina containing sapphire, silicon nitride, aluminum nitride, gallium nitride (GaN) free-standing substrate, silicon carbide (SiC), diamond, alkali halide, and alkaline earth metal halide. Among these, $SiO_2$ or sapphire is preferable.

When a nitride semiconductor layer described below is provided, a transparent substrate on which a nitride semiconductor layer can be easily provided may be selected. For example, when the nitride semiconductor layer is GaN, the material constituting the transparent substrate is preferably transparent alumina containing sapphire, and particularly preferably sapphire, because of the ease of providing a GaN layer.

Although the thickness of the transparent substrate is not particularly limited, the transparency tends to decrease when the thickness is too large, and the strength as a support becomes insufficient when the thickness is too small, and therefore, the thickness is usually 10 μm or more, and preferably 100 μm or more, and is usually 5 mm or less, and preferably 1 mm or less.

(Ta Nitride Layer)

Although the thickness of the Ta nitride layer formed on the transparent substrate is not particularly limited, the transparency tends to decrease when the thickness is too large, and sufficient power generation performance may be not obtained when the thickness is too small, and therefore, the thickness is usually 50 nm or more, and preferably 100 nm, and usually 2 μm or less, and preferably 1 μm or less.

The Ta nitride layer formed on the transparent substrate may be formed only of Ta nitride, and may be doped with an impurity as long as an effect of the present invention is not impaired.

In the present embodiment, the Ta nitride constituting the Ta nitride layer is not particularly limited, and examples thereof includes δ-TaN, ε-TaN, and $Ta_3N_5$. Among these, $Ta_3N_5$ is preferable from the viewpoint of high light transmittance, optical semiconductor characteristics, and high photocatalytic activity.

(Nitride Semiconductor Layer)

A nitride semiconductor layer is arranged between a transparent substrate and a Ta nitride layer, and can secure the transparency of the transparent substrate when nitriding a Ta nitride precursor. The nitride semiconductor layer preferably operates as an excited carrier discrimination layer. Excited carrier discrimination will be described below.

When the surface of a transparent electrode for oxygen production (Ta nitride transparent electrode) is irradiated with light, an electron and a hole, which are photoexcited carriers, are generated on the surface of the transparent electrode. When all the holes of the generated photoexcited carriers react quickly with water to generate oxygen, the performance of an electrode catalyst is used without wasting, but in many cases, this is not the case, and a certain percentage of the generated photoexcited carriers will not react with water, and the electrons and holes will recombine, deteriorating the performance of an electrode. An excited carrier discrimination layer plays a role of quickly separating excited carriers and suppressing recombination.

By providing a nitride semiconductor layer, not only the transparency of a substrate can be ensured, but also the oxygen production ability can be considerably improved. The present inventors speculate from a quantum mechanical theory calculation that a nitride semiconductor layer may considerably improve the performance of a transparent photocatalyst electrode by effectively suppressing a recombination process of an electron and a hole as photoexcited carriers as described above.

The nitride semiconductor layer may be any transparent nitride semiconductor, and in terms of electronic band structure, it is preferable that the upper end of the valence band is located at an energy level deeper than the upper end of the valence band of Ta nitride, and the lower end of the conductive band is located between the upper end of the valence band of Ta nitride and the lower end of the conductive band. Specific examples of the nitride semiconductor layer include GaN, AlGaN, InGaN, and InAlGaN. Such a nitride semiconductor layer may be doped with a dopant to control the internal carrier concentration. Examples of the dopant include Mg, Si, Zn, Hg, Cd, Be, Li, and C, and these dopants may be used singly or in combination of two or more kinds thereof. The thickness of the nitride semiconductor layer is not particularly limited since the thickness can be appropriately set according to the intensity of light to be used, and it is preferable that the thickness is usually 100 nm or more, and preferably 500 nm or more since light having wavelength used for oxygen production can be sufficiently absorbed. The upper limit is not particularly limited, and is usually 10 μm or less, and preferably 6 μm or less. This is preferable from the viewpoint that a portion where light having wavelength used for oxygen production does not reach is not used for oxygen production and that a charge lost due to recombination can be reduced even when the thickness is more than a certain extent.

This nitride semiconductor layer may be replaced with a diamond or SiC layer, and the preferred film thickness and energy level when replaced with diamond or SiC are the same as those of the nitride semiconductor.

The transparent electrode for oxygen production of the present embodiment may support a cocatalyst if necessary. By supporting a cocatalyst, the oxygen generation ability can be improved. As the cocatalyst, a known catalyst can be used as appropriate, and a known method can be used for supporting the cocatalyst, and a cocatalyst can be supported within a range that does not impair the transparency of a transparent electrode for oxygen production.

Specific examples of the cocatalyst include a metal oxide such as $IrO_x$, $NiO_x$, $FeO_x$, or $CoO_x$, a metal composite oxide such as $NiCoO_x$ or $NiFeCoO_x$, and a cobalt salt such as cobalt phosphide, cobalt phosphate, or cobalt boride.

(Electrode Performance)

As described above, the transparent electrode for oxygen production according to the present embodiment has high transparency, and in addition, has high electrode performance. Specifically, this electrode has a high electrode performance such that a photocurrent density of 3 mA/cm$^2$ or more, preferably 4 mA/cm$^2$ or more is obtained in 1.23V vs. RHE (hereinafter, also referred to as $1.23V_{RHE}$) condition under AM1.5G irradiation.

<Method for Producing Transparent Electrode for Oxygen Production 1>

Hereinafter, the method for producing a transparent electrode for oxygen production according to a first embodiment of the present invention will be described.

The production method according to the present embodiment includes a precursor formation step of forming a Ta nitride precursor layer on a transparent substrate and a nitriding step of nitriding the Ta nitride precursor layer by a gas containing ammonia and a carrier gas. If necessary, the method may include a nitride semiconductor layer forming step of forming a nitride semiconductor layer between the transparent substrate and the Ta nitride precursor.

(Formation of Nitride Semiconductor Layer)

The step of forming a nitride semiconductor layer on a transparent substrate is not particularly limited, and the nitride semiconductor may be formed on the transparent substrate by a known method. As a method for forming a nitride semiconductor, for example, a vapor phase growth method such as MOCVD may be used, or physical vapor deposition such as sputtering or an electron beam may be used.

(Formation of Ta Nitride Precursor Layer)

The precursor forming step is a step of forming a Ta nitride precursor layer on a transparent substrate, or on a layered body of a transparent substrate and a nitride semiconductor layer when the above-described nitride semiconductor layer is included.

The Ta nitride precursor layer is not particularly limited as long as the layer is a compound which becomes Ta nitride, or preferably $Ta_3N_5$ by nitriding, and examples thereof include metal tantalum, amorphous tantalum, $TaO_x$, a tantalum complex, $TaCl_5$, and $Ta_2O_5$. Among these, preferred examples are tantalum oxides, tantalum halides, and metal tantalum, which evaporate from a layer as water or chlorine without remaining in the layer as an impurity after decomposition like carbon.

The thickness of a Ta nitride precursor layer is appropriately set according to a desired thickness of a Ta nitride layer after nitriding.

The method for forming a Ta nitride precursor layer is not particularly limited, and may be, as in the case of a nitride semiconductor layer, for example, a vapor phase growth method such as MOCVD or physical vapor deposition such as MBE, PLD, sputtering, or electron beam. A Ta nitride precursor layer may be formed by a coating method using an ink such as ink-jet printing, screen printing, or spin coating. As a raw material of a Ta nitride precursor to be used, a commercially available product can be used. The formation temperature at the time of forming a Ta nitride precursor layer is not particularly limited as long as nitridation does not proceed, and may be usually 1,000° C. or lower. The atmosphere is also not particularly limited, and may be an air atmosphere or an inert atmosphere such as nitrogen gas or argon. The pressure at the time of forming a layer is not particularly limited, and a layer may be formed under atmospheric pressure, under reduced pressure, or under pressure, and the pressure is usually 0 Pa or more and 10 MPa or less.

(Nitriding of Ta Nitride Precursor Layer)

The nitriding step is a step of nitriding a Ta nitride precursor layer to form a Ta nitride layer.

In the present embodiment, a Ta nitride precursor layer is nitrided with a mixed gas containing ammonia and a carrier gas in a nitriding step. Conventionally, nitridation for forming a Ta nitride layer has been performed using a 100% ammonia gas. In the present embodiment, it has been arrived at that a Ta nitride layer which is transparent and has high oxygen production ability is obtained by using a mixed gas of ammonia and a carrier gas.

The carrier gas in the mixed gas is preferably an inert gas such as nitrogen gas or argon, and more preferably nitrogen gas. When the mixed gas is composed of ammonia and nitrogen, the volume ratio of ammonia and nitrogen in the mixed gas is not particularly limited, and is usually from 99:1 to 1:99, and may be from 10:90 to 90:10, from 15:85 to 70:30, and from 20:80 to 50:50.

The mixed gas may contain a gas other than ammonia, nitrogen, and argon as long as an effect of the present invention is not impaired, and the proportion thereof is preferably 5% by volume or less, and may be 3% by volume or less, 2% by volume or less, and 1% by volume or less.

The nitriding temperature in the nitriding step is usually 500° C. or higher and may be 1,000° C. or lower. The temperature is usually 950° C. or lower, and may be 900° C. or lower. The nitriding time is not particularly limited, and is usually 1 minute or more, and may be 1 hour or more. The time is usually 10 hours or less, and may be 4 hours or less.

<Transparent Electrode for Oxygen Production 2>

Hereinafter, a transparent electrode for oxygen production according to a second embodiment of the present invention will be described.

The transparent electrode for oxygen production according to the second embodiment of the present invention is a transparent electrode for oxygen production including a Ti nitride layer instead of a Ta nitride layer of the transparent electrode for oxygen production according to the first embodiment, and includes a nitride semiconductor layer between a transparent substrate and a Ti nitride layer.

(Ti Nitride Layer)

Although the thickness of the Ti nitride layer formed on the transparent substrate is not particularly limited, the transparency tends to decrease when the thickness is too large, and sufficient power generation performance may be not obtained when the thickness is too small, and therefore, the thickness is usually 50 nm or more, and preferably 100 nm or more, and usually 2 μm or less, and preferably 1 μm or less.

The Ti nitride layer formed on the transparent substrate may be formed only of Ti nitride (TiN), and may be doped with an impurity as long as an effect of the present invention is not impaired.

For the descriptions of "transmittance of electrode", "transparent substrate", "nitride semiconductor layer", and "electrode property" of the transparent electrode for oxygen production according to the second embodiment, the descriptions of "electrode transmittance", "transparent substrate", "nitride semiconductor layer", and "electrode performance" of the transparent electrode for oxygen production according to the first embodiment are used. In other words, the description of Ta may be replaced with Ti.

The feature of the second embodiment is that a nitride semiconductor layer is provided between a transparent substrate and a Ti nitride layer, which can quickly separate excited carriers and suppress recombination, and therefore, the efficiency of a transparent electrode for oxygen production using Ti nitride can be improved.

<Method for Producing Transparent Electrode for Oxygen Production 2>

The method for producing a transparent electrode for oxygen production according to a second embodiment of the present invention will be described.

The production method according to the present embodiment is not particularly limited as long as a nitride semiconductor layer can be formed between a transparent substrate and a Ti nitride layer. More specifically, the production method according to the present embodiment includes, as in the method for producing a transparent electrode for oxygen production according to the first embodiment of the present invention, a precursor formation step of forming a Ti nitride precursor layer on a transparent substrate and a nitriding step of nitriding the Ti nitride precursor layer by a gas containing ammonia and a carrier gas. In the present embodiment, a nitride semiconductor layer forming step of forming a nitride semiconductor layer between a transparent substrate and a Ti nitride precursor is required.

As the descriptions of "formation of nitride semiconductor layer" and "nitridation of Ti nitride precursor layer" in the method for producing a transparent electrode for oxygen production according to the second embodiment of the present invention, the descriptions of "formation of nitride semiconductor layer" and "nitridation of Ta nitride precursor" in the method for producing a transparent electrode for oxygen production according to the first embodiment of the present invention are used, respectively.

(Formation of Ti Nitride Precursor Layer)

The precursor forming step is a step of forming a Ti nitride precursor layer on a transparent substrate, or on a layered body of a transparent substrate and a nitride semiconductor layer when the above-described nitride semiconductor layer is included.

The Ti nitride precursor layer is not particularly limited as long as the layer is a compound that becomes Ti nitride (TiN) by nitriding, and examples thereof include metal titanium, $TiO_x$, a titanium complex, and $TiCl_4$. Among these, preferred examples are titanium oxides, titanium halides, and metal titanium, which evaporate from a layer as water or chlorine without remaining in the layer as an impurity after decomposition like carbon.

The thickness of a Ti nitride precursor layer is appropriately set according to a desired thickness of a Ti nitride layer after nitriding.

The method for forming a Ti nitride precursor layer is not particularly limited, and may be, as in the case of a nitride semiconductor layer, for example, a vapor phase growth method such as MOCVD or physical vapor deposition such as MBE, PLD, sputtering, or electron beam. A Ti nitride precursor layer may be formed by a coating method using an ink such as ink-jet printing, screen printing, spin coating, or dipping. As a raw material of a Ti nitride precursor to be used, a commercially available product can be used. The formation temperature at the time of forming a Ti nitride precursor layer is not particularly limited as long as nitridation does not proceed, and may be usually 1,000° C. or lower. The atmosphere is also not particularly limited, and may be an air atmosphere or an inert atmosphere such as nitrogen gas or argon. The pressure at the time of forming a layer is not particularly limited, and a layer may be formed under atmospheric pressure, under reduced pressure, or under pressure, and the pressure is usually 0 Pa or more and 10 MPa or less.

<Water Splitting Reaction Electrode>

By installing the transparent electrode for oxygen production according to the first embodiment or the second embodiment of the present invention in combination with an electrode for hydrogen production as a counter electrode, a water splitting reaction electrode can be formed.

(Electrode for Hydrogen Production)

As the electrode for hydrogen production, a known electrode can be used.

The electrode for hydrogen production is not particularly limited as long as the electrode is a p-type semiconductor photoelectrode with an absorption edge wavelength longer than 600 nm, and specific examples thereof include a multicomponent system having a composition of Cu (I) such as copper indium gallium selenide ($CuIn_xGa_{1-x}Se_2$), copper zinc tin sulfide ($Cu_2ZnSnS_4$), delafossite ($CuFeO_2$), lanthanum titanium copper oxysulfide ($La_5Ti_2CuS_5O_7$), or indium copper sulfide ($CuInS_2$), a II-VI system such as cadmium telluride (CdTe), a III-V system such as gallium arsenide (GaAs), and p-type silicon (p-Si). It is preferable that the surface of these semiconductor photoelectrodes is modified with CdS, $In_2S_3$, ZnS, or the like to form a p-n junction on the electrode surface, and then a cocatalyst for promoting hydrogen production represented by Pt and Ru is immobilized and used for a water splitting electrode.

<Tandem Water Splitting Reaction Electrode>

Hereinafter, a tandem water splitting reaction electrode according to a third embodiment of the present invention will be described.

The transparent electrode for oxygen production according to the first or second embodiment of the present invention has light transmittance at wavelength of 600 nm to 900 nm of 80% or more, and preferably 90% or more, and therefore, a tandem water splitting reaction electrode in which such a transparent electrode for oxygen production and an electrode for hydrogen production are stacked can be formed. In other words, since the transparent electrode for oxygen production according to the first or second embodiment of the present invention transmits long wavelength light of 600 nm or more used by an electrode for hydrogen production sufficiently, when the transparent electrode for oxygen production and an electrode for hydrogen production are stacked, light with wavelength shorter than 600 nm out of an incident light from outside produces oxygen by the transparent electrode for oxygen production, long wavelength light with wavelength 600 nm or more that is not used in the transparent electrode for oxygen production transmits, and the transmitted light is used by the electrode for hydrogen production. For this reason, when a tandem water splitting reaction electrode is used, a transparent electrode for oxygen production is arranged closer to the incident light than an electrode for hydrogen production.

Since there is no need to arrange both electrodes in a plane by using a transparent electrode for oxygen production according to the present embodiment, water splitting can be performed with respect to incident light such as sunlight at about twice the efficiency as compared with the case of arrangement in a plane.

As described above, according to the present invention, a transparent electrode for oxygen production which has high transparency and high electrode performance can be provided, and can produce oxygen with high efficiency as an electrode for water splitting. The transparent electrode for oxygen production provided by the present invention can produce a photocurrent density of 5.7 mA/cm$^2$ at 1.23 V vs. RHE under simulated sunlight (AM1.5G) irradiation, and when such an electrode is applied to a tandem water splitting cell, a solar energy conversion efficiency of 7% can be theoretically achieved.

<Oxygen Production Device>

The oxygen production device according to a fourth embodiment of the present invention includes the transparent electrode for oxygen production according to the first or second embodiment of the present invention. By using the transparent electrode for oxygen production, oxygen can be produced from water using solar energy efficiently.

<Water Splitting Device>

The water splitting device according to a fifth embodiment of the present invention described below includes the transparent electrode for oxygen production according to the first or second embodiment of the present invention and/or the tandem water splitting reaction electrode according to the third embodiment of the present invention. By using the transparent electrode for oxygen production and/or the tandem water splitting reaction electrode, a device for splitting water using solar energy efficiently can be made.

<Method of Synthesizing Compound>

Hereinafter, the method for synthesizing a compound according to a sixth embodiment of the present invention will be described.

The method for synthesizing a compound according to the present embodiment includes a step of reacting hydrogen and/or oxygen obtained by splitting water with the above-described water splitting device.

The synthesis reaction used in the synthesis method according to the present embodiment is not particularly limited, and the compound obtained by the synthesis may be an inorganic compound or an organic compound. Examples of the inorganic compound include ammonia and hydrogen peroxide. Examples of the organic compound include a lower olefin having about from 2 to 4 carbon atoms, and an alcohol.

More specifically, for example, ammonia can be synthesized by reacting hydrogen obtained by splitting water with the above water splitting device with nitrogen. By reacting hydrogen with carbon dioxide, methanol as a chemical raw material can be produced. Furthermore, ethylene and propylene can be synthesized from the obtained methanol by the MTO reaction.

On the other hand, oxygen obtained by splitting water by the above-described water splitting device can synthesize ozone by irradiating energy such as an ultraviolet ray. Hydrogen peroxide can be synthesized by reacting oxygen with water in the presence of a photocatalyst.

Oxygen obtained by splitting water by the above-described water splitting device can be used for purposes such as steelmaking, refining of non-ferrous metals, melting glass raw materials or cutting steel, rocket fuel, chemical oxidation, or medical oxygen in addition to the above-described synthesis method for producing ozone and hydrogen peroxide.

<Compound Synthesis Device>

Hereinafter, a compound synthesis device according to a seventh embodiment of the present invention will be described.

The compound synthesis device according to the present embodiment is a synthesis device including a water splitting device and a reactor in which a catalyst is arranged, which is a device that introduces hydrogen obtained from the water splitting device and another raw material into the reactor to be allowed to react in the reactor.

With such a configuration, a desired compound can be synthesized by introducing obtained hydrogen together with other raw materials into a reactor including a catalyst suitable for each reaction, and allowing the mixture to react in the reactor.

(Other Materials)

In the present embodiment, other raw materials are not particularly limited, and may be appropriately selected depending on a desired compound. Specific examples thereof include carbon dioxide, carbon monoxide, and nitrogen.

By reacting obtained hydrogen with carbon dioxide or carbon monoxide, for example, a lower olefin having about from 2 to 4 carbon atoms can be synthesized. Ammonia can be synthesized by reaction between obtained hydrogen and nitrogen.

Such other raw materials may be charged in a raw material supply device in advance, for example, and introduced into the reactor as needed.

(Reactor)

In the present embodiment, a reactor is not particularly limited as long as the reactor has a catalyst therein, and can synthesize a desired compound by internally reacting hydrogen obtained from the above-described water splitting device with another raw material, and a known one can be used.

Since many reactions are reactions utilizing chemical equilibrium, a desired compound can be obtained with higher efficiency by installing a separation film in such a reactor and taking out the obtained reaction product from the reactor.

The catalyst can be appropriately selected from a known catalyst according to a synthesis reaction performed in the reactor.

By utilizing the transparent electrode for oxygen production according to the first or second embodiment of the present invention, water can be easily splitted into oxygen and hydrogen by a so-called artificial photosynthesis. Various compounds can be efficiently obtained using hydrogen generated by water splitting.

EXAMPLES

Hereinafter, the present invention will be described in more detail with reference to Examples, but it goes without saying that the scope of the present invention is not limited to Examples.

Example 1

Preparation Example 1: Preparation of $Ta_3N_5$ Photocatalyst on Insulating Transparent Substrate Using RF magnetron sputtering, $TaO_x$, which was a $Ta_3N_5$ precursor, was stacked on a $SiO_2$ transparent substrate having a thickness of 0.4 mm and a transmittance of about 93% with light having wavelength of 200 mm or more, and an aggregate A ($Ta_3N_5$ precursor thin film/$SiO_2$) was obtained. For stacking $TaO_x$, a $Ta_3N_5$ precursor thin film having a thickness of 500 nm was stacked using ES-250L manufactured by EIKO Co. Ltd.

An aggregate B ($Ta_3N_5$ photocatalyst film: film thickness 500 nm/$SiO_2$) was obtained by subjecting an aggregate A to a nitriding treatment at 750-950° C. for 1 hour in an electric tube furnace under a stream of a mixed gas composed of ammonia gas and nitrogen gas at mixing ratios of 10:0, 5:5, 3:7, and 2:8.

Evaluation was performed by UV-vis (ultraviolet/visible) transmission spectrum measurement, UV-vis reflection spectrum measurement, and XRD (X-ray diffraction) measurement, and it was confirmed that the obtained photocatalyst film was tantalum nitride ($Ta_3N_5$). UV-Visible spectrophotometer V-670 manufactured by JASCO Corporation was used for UV-vis transmission spectrum measurement and UV-vis reflection spectrum measurement, and a SmartLab X-ray diffractometer manufactured by Rigaku Corporation was used for XRD measurement, and similar devices were used in the following Examples.

(Cocatalyst Formation)

Iron (III) tris(2-ethylhexanoate) and nickel (II) 2-ethylhexanoate were dissolved in hexane, and this solution was dropped on the surface of the photocatalytic thin film of the aggregate B manufactured in the above-described Preparation Example 1. Ultraviolet rays were applied to support an Ni—Fe oxide-based cocatalyst on the surface of a photocatalyst layer. The surface of the photocatalyst layer was washed with a hexane solvent.

(Preparation of Transparent Photoelectrode)

The surface of the aggregate B manufactured in the above-described Production Example 1 was spot-soldered using a low melting point metal such as indium, and a photocatalytic thin film and a metal wire with a resin coating were connected to the aggregate B. A metal such as indium also plays a role in electric transport from a photocatalytic thin film to an external circuit. The exposed metal portion other than the photocatalyst layer was then covered with an epoxy resin.

FIG. 1 shows the transmittance at from 600 nm to 900 nm of a thus obtained transparent photoelectrode.

(Performance Evaluation of Transparent Photoelectrode)

Using a transparent photoelectrode having a cocatalyst supported on the surface of the aggregate B manufactured in the above-described Production Example 1, the activity of a water splitting reaction was evaluated by photoelectrochemical measurement in an electrolytic solution in which a supporting electrolyte such as potassium phosphate was dissolved. Dissolved oxygen was removed by passing argon gas through the electrolytic solution.

A potentiostat manufactured by HOKUTO DENKO CORPORATION (HSV 110) was connected to a three-electrode electrochemical cell, and simulated sunlight was irradiated using a solar simulator (XES-40S2) manufactured by SAN-EI Electronic Industries Co., Ltd. while controlling the electrode potential of the transparent photoelectrode.

(Results)

Figure 3:
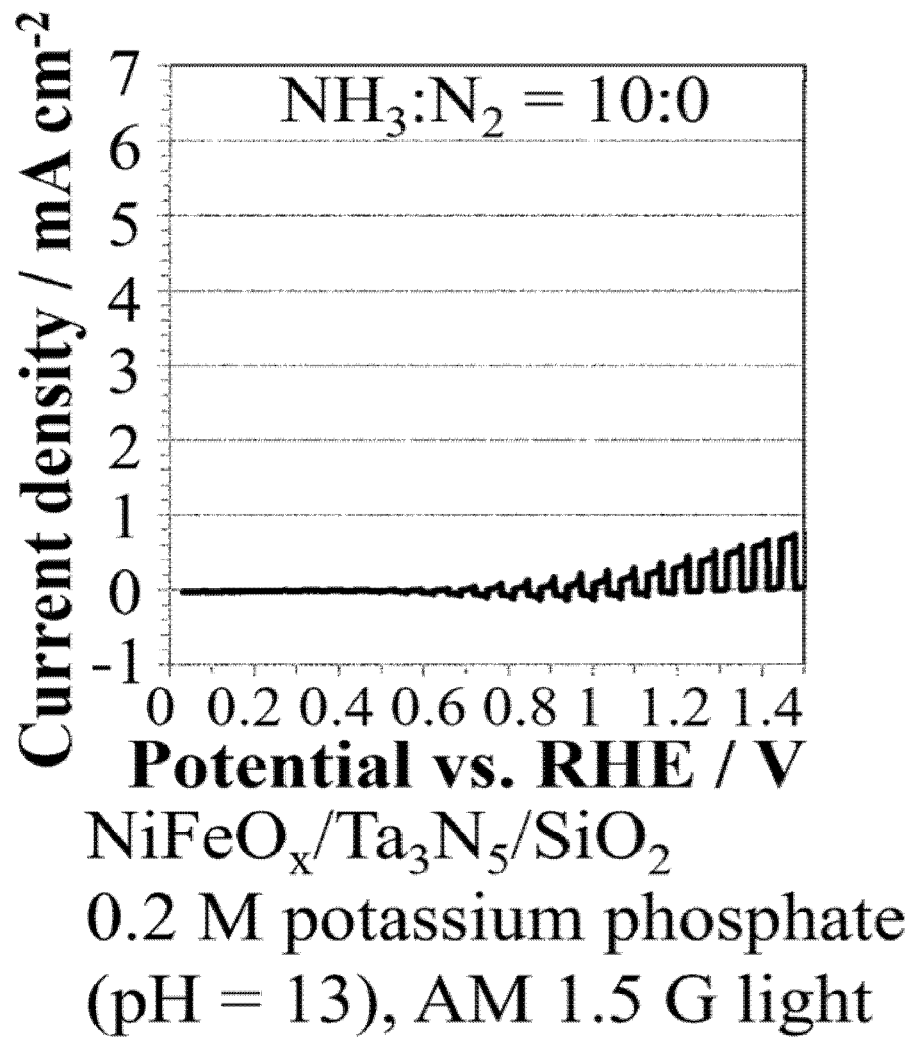
FIG. 3 shows a voltammogram of a transparent photoelectrode of an aggregate obtained by nitriding under the condition of 100% ammonia gas measured in Example 1.

A transparent photoelectrode of the aggregate B obtained by nitriding under the condition of 100% ammonia gas generated a photocurrent of 0.3 mA/cm$^2$ at 1.23 V vs. reversible hydrogen electrode ($V_{RHE}$). FIG. 3 shows a voltammogram of the transparent photoelectrode thus obtained.

Figure 4:
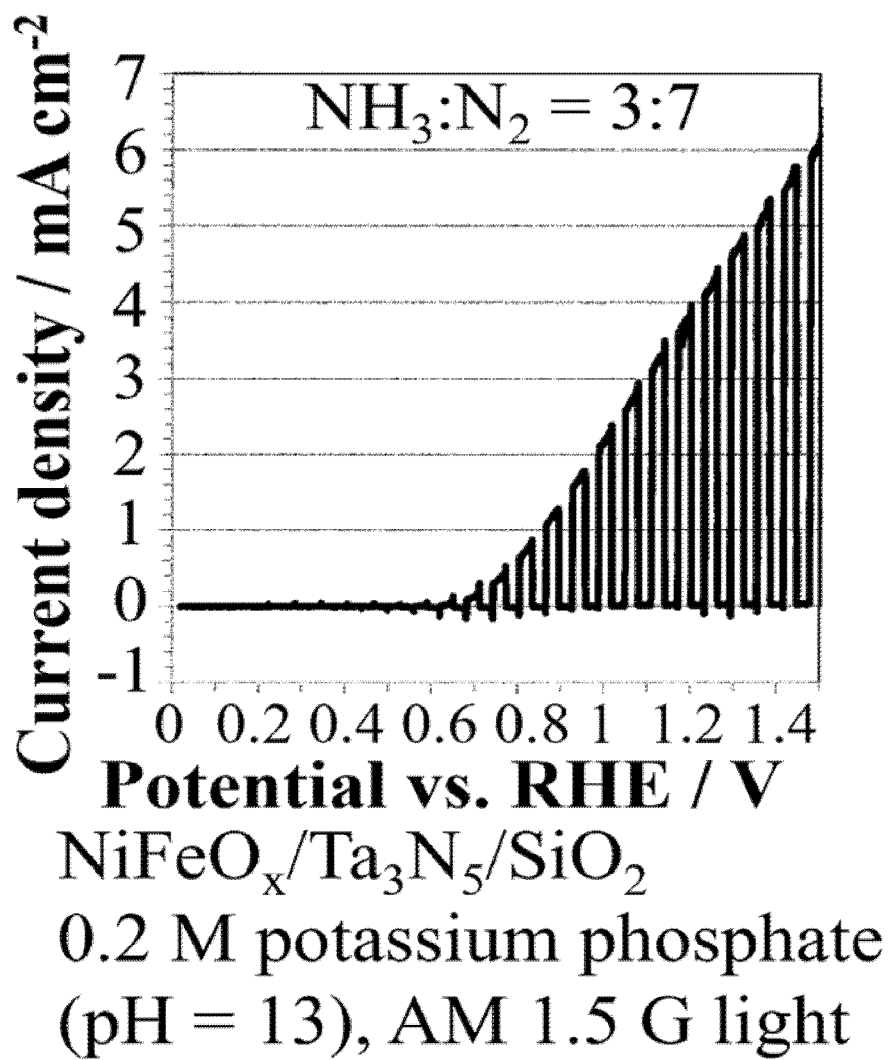
FIG. 4 shows a voltammogram of a transparent photoelectrode of an aggregate obtained by nitriding with a mixed gas composed of ammonia gas and nitrogen gas (NH$_3$:N$_2$=3:7), measured in Example 1.
Figure 5:
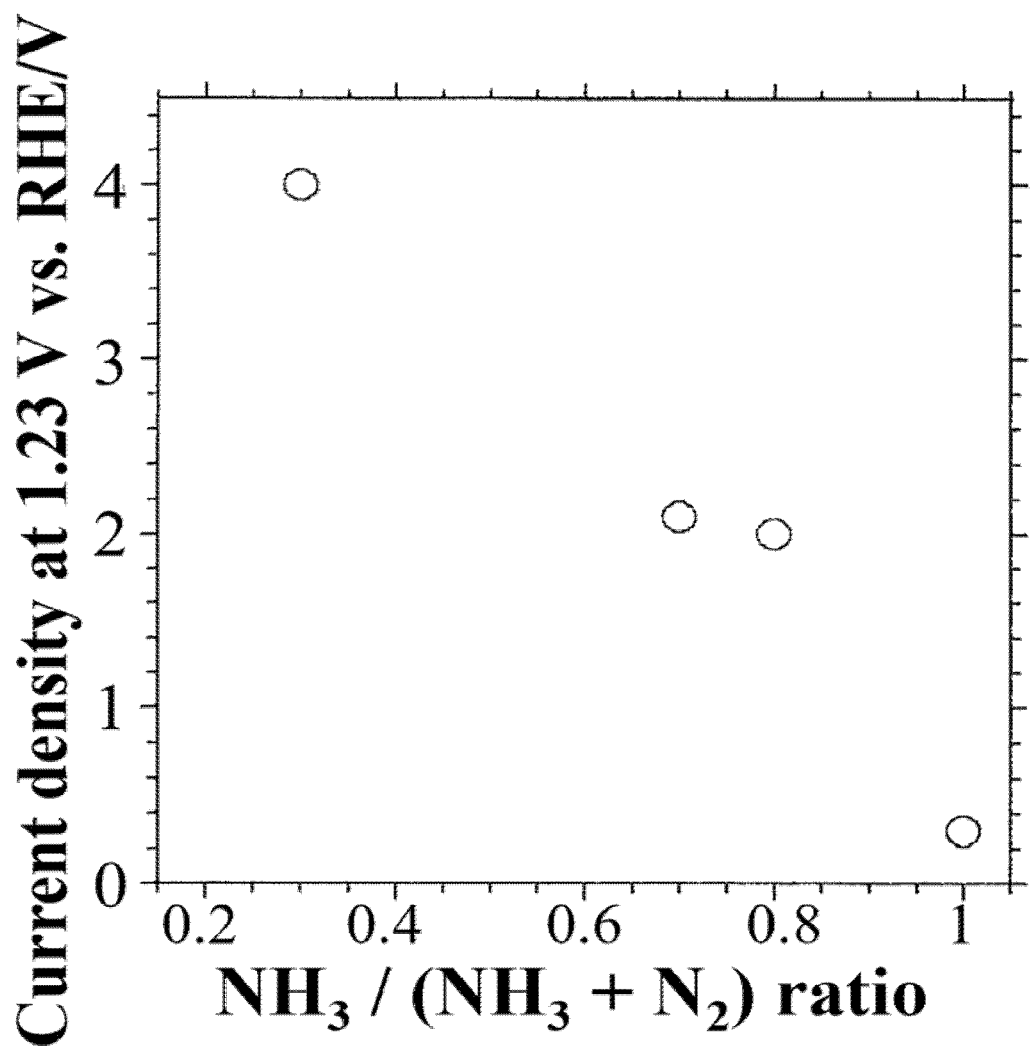
FIG. 5 shows the relationship between the ratio of a mixed gas of ammonia gas and nitrogen gas and the photocurrent density at 1.23 $V_{RHE}$.

On the other hand, the transparent photoelectrode of the aggregate B obtained by nitriding with a mixed gas composed of ammonia gas and nitrogen gas ($NH_3:N_2=3:7$) generated a photocurrent larger by at least one order of magnitude of 4.0 mA/cm$^2$. FIG. 4 shows a voltammogram of the transparent photoelectrode thus obtained. By developing a new nitriding process using a mixed gas, the photocurrent value was greatly enhanced. FIG. 5 shows the relationship between the ratio of a mixed gas of ammonia gas and nitrogen gas and the photocurrent density at 1.23 $V_{RHE}$. It was found that the smaller the ratio of the ammonia gas, the more the photocurrent density was significantly increased.

The voltammogram was measured at a potential sweep speed (v)=10 mVs$^{-1}$, and a potential sweep range (1.5 $V_{RHE}$->0 $V_{RHE}$).

Example 2

Preparation Example 2: Preparation of Transparent Photocatalyst Electrode with Nitride Semiconductor Layer Introduced Between Photocatalyst Layer and Transparent Substrate Using a sapphire transparent substrate on which GaN (gallium nitride: 4,000 nm in thickness) was stacked, $TaO_x$, which was a $Ta_3N_5$ precursor, was stacked on the GaN surface in the same manner as in Example 1 to obtain an aggregate C ($Ta_3N_5$ precursor thin film: 500 nm/GaN/sapphire). An aggregate D ($Ta_3N_5$ photocatalyst film/GaN/sapphire) was obtained by subjecting the aggregate C to a nitriding treatment at from 750° C. to 950° C. for 1 hour in an electric tubular furnace under a stream of a mixed gas composed of ammonia gas and nitrogen gas at various mixing ratios of 10:0, 8:2, 7:3, and 3:7. Evaluation was performed using the same method as in Example 1, and it was confirmed that the obtained photocatalyst film was tantalum nitride ($Ta_3N_5$)

(Cocatalyst Formation)

Using the same method as in Example 1, an appropriate amount of a cocatalyst was supported on the surface of the aggregate D.

(Preparation of Transparent Photoelectrode)

A metal wire with a resin coating was soldered to a GaN portion of the aggregate D manufactured in the above-described Preparation Example 2 and supporting a cocatalyst using the same method as in Example 1. In this case, a low melting point metal such as indium for soldering a metal wire may be in contact with only GaN or both $Ta_3N_5$ and GaN. The exposed metal portion (indium) other than the photocatalyst layer was covered with an epoxy resin.

Figure 2:
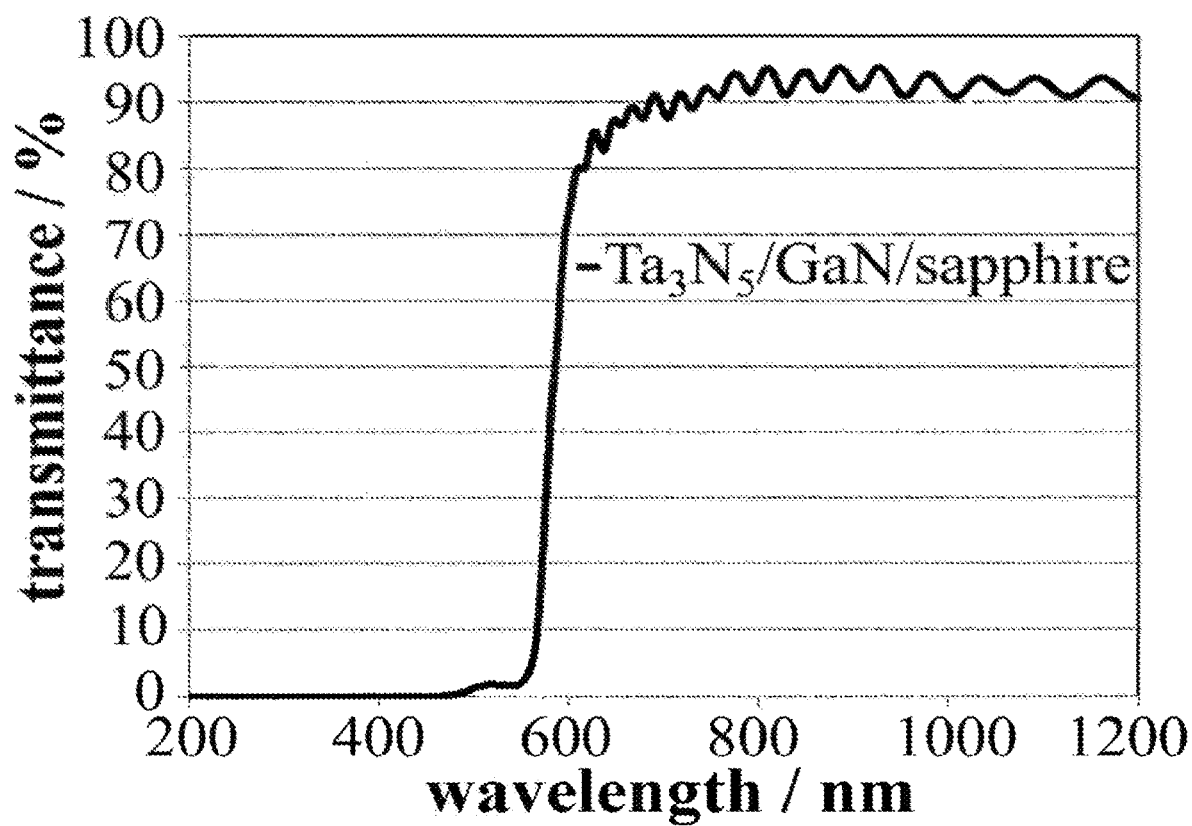
FIG. 2 shows the transmittance at from 600 nm to 900 nm of the transparent photoelectrode prepared in Example 2.

FIG. 2 shows the transmittance of the transparent photoelectrode thus obtained at wavelength of 600 nm to 900 nm.

(Performance Evaluation of Transparent Photoelectrode)

Using the same method as in Example 1, the water splitting activity of the transparent photoelectrode composed of the aggregate D supporting a cocatalyst was evaluated.

(Results)

Figure 6:
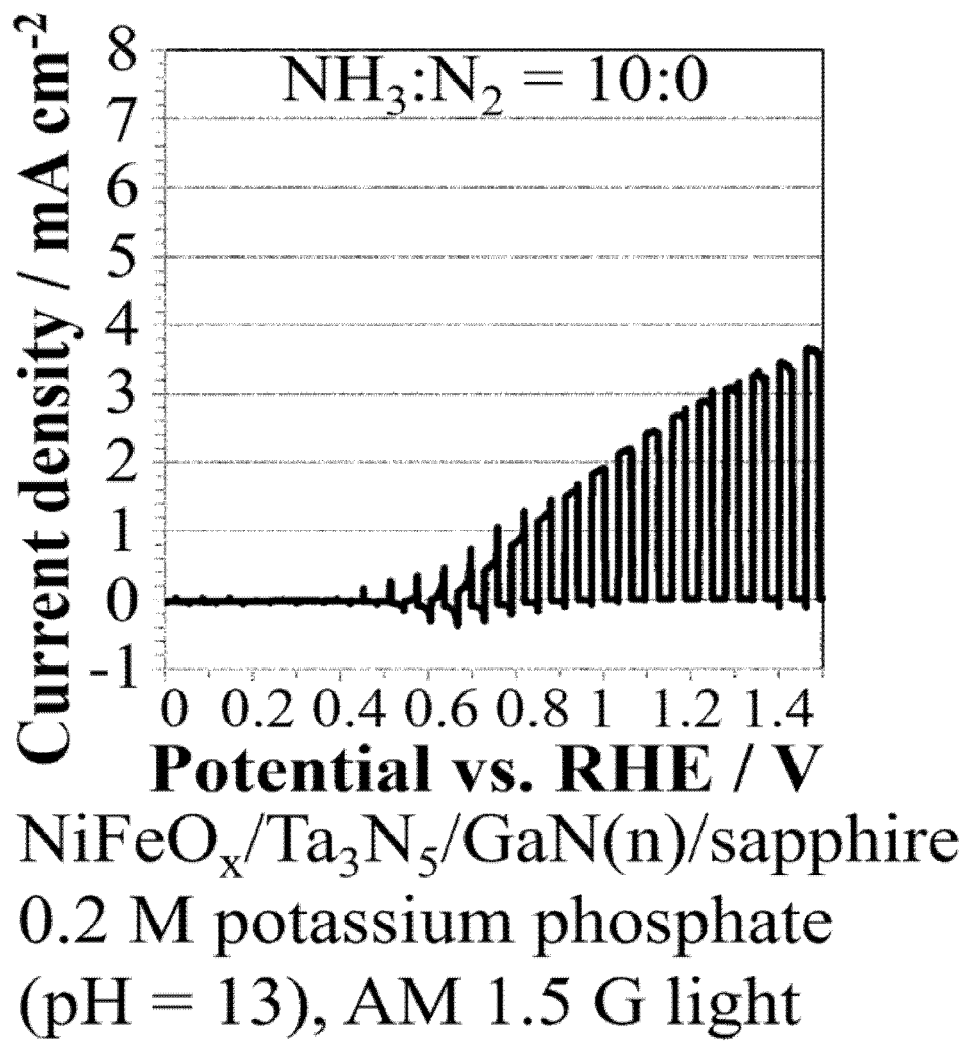
FIG. 6 shows a voltammogram of a transparent photoelectrode of an aggregate obtained by nitriding under the condition of 100% ammonia gas, measured in Example 2.

The transparent photoelectrode of the aggregate D obtained by nitriding under the condition of 100% ammonia gas generated a photocurrent of 2.9 mA/cm$^2$ at 1.23 $V_{RHE}$. FIG. 6 shows a voltammogram of the transparent photoelectrode thus obtained.

Figure 7:
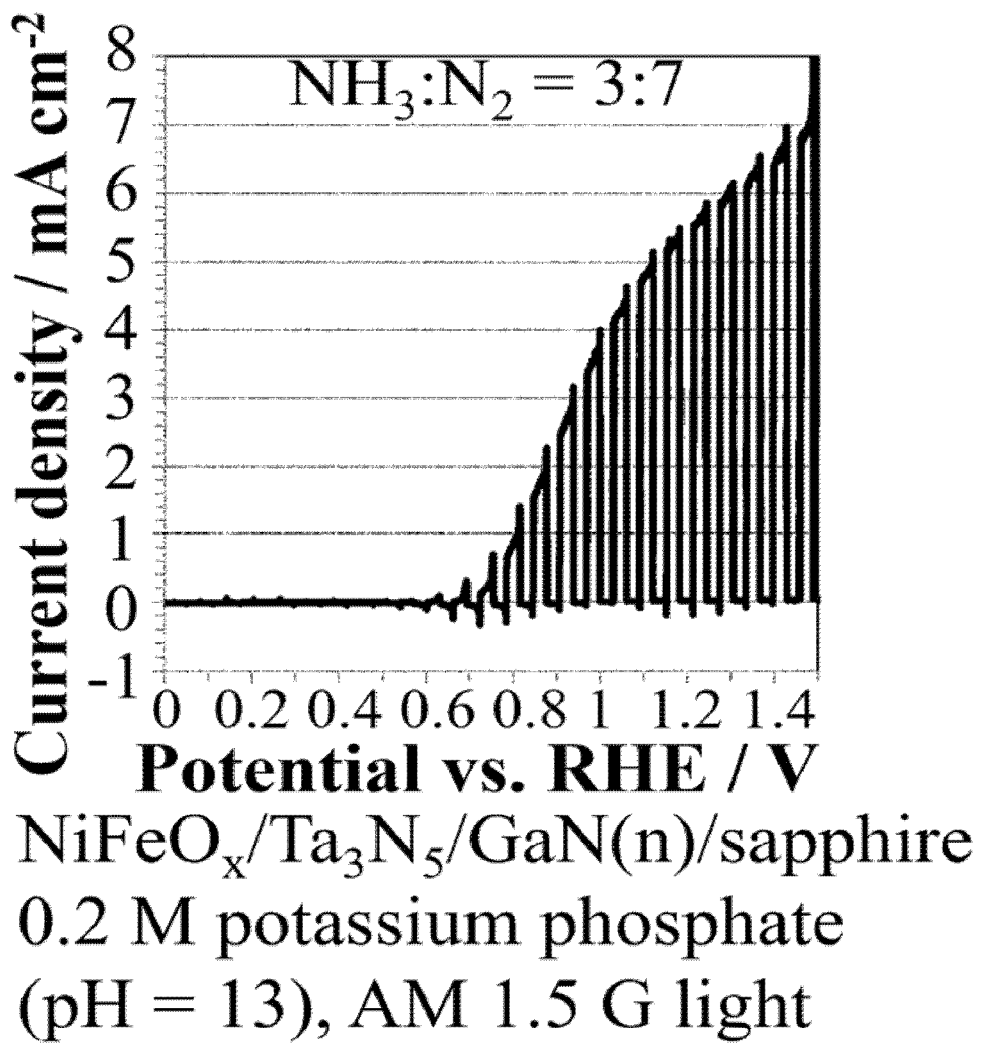
FIG. 7 shows a voltammogram of a transparent photoelectrode of an aggregate obtained by nitriding with a mixed gas composed of ammonia gas and nitrogen gas (NH$_3$:N$_2$=3:7), measured in Example 2.
Figure 8:
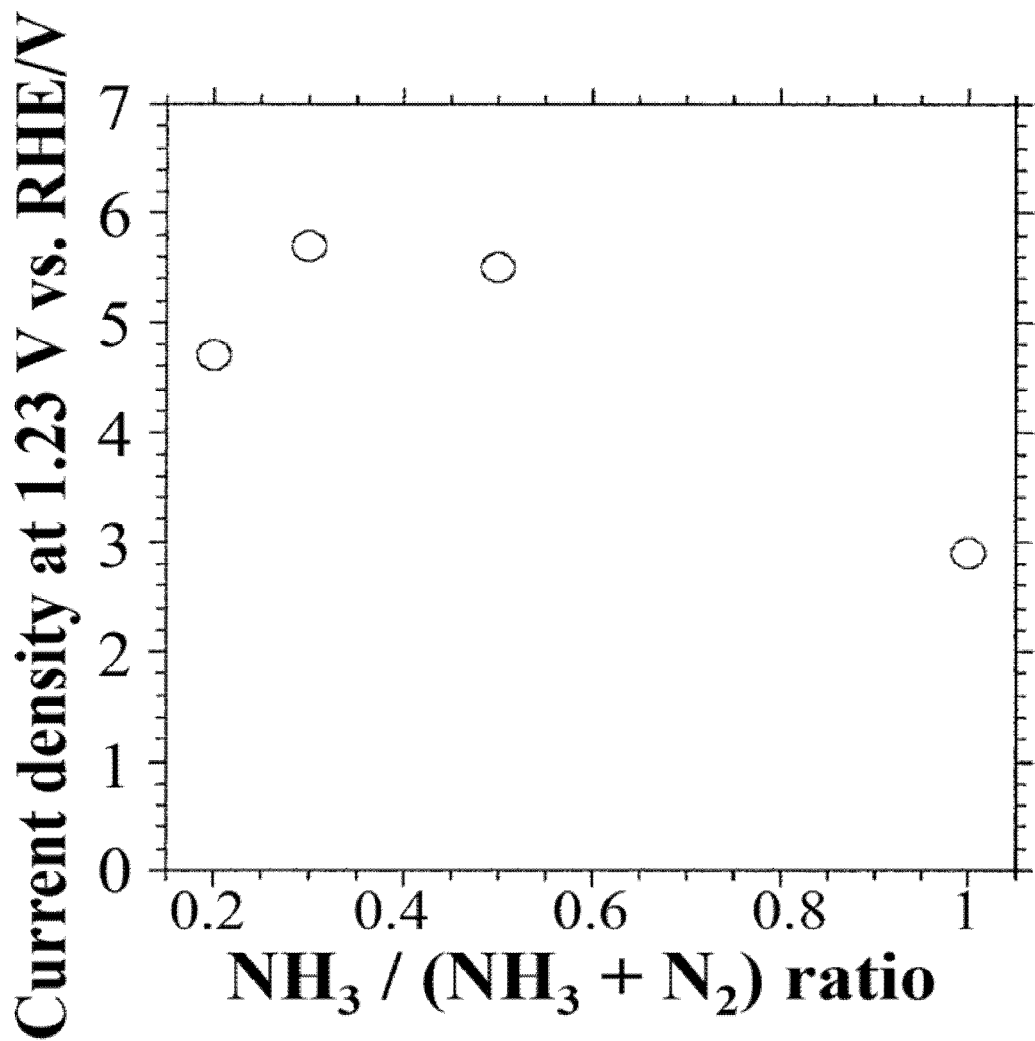
FIG. 8 shows the relationship between the ratio of a mixed gas of ammonia gas and nitrogen gas and the photocurrent density at 1.23 $V_{RHE}$.

The transparent photoelectrode of the aggregate D obtained by nitriding with a mixed gas of ammonia gas and nitrogen gas (the ratio was $NH_3:N_2=3:7$) generated a high photocurrent of 5.7 mA/cm$^2$. FIG. 7 shows a voltammogram of the transparent photoelectrode thus obtained. By introducing a nitride semiconductor layer, the performance of a transparent photocatalyst electrode was remarkably improved by effectively suppressing a recombination process of an electron and a hole as excitons. FIG. 8 shows the relationship between the ratio of a mixed gas of ammonia gas and nitrogen gas and the photocurrent density at 1.23 $V_{RHE}$. As the ratio of ammonia gas in a mixed gas became smaller, the photocurrent density tended to increase considerably. It is noted that, when the ratio of the ammonia gas was smaller than 20%, a decrease in the photocurrent density was observed. A new nitriding process using a mixed gas and development of a new structure including an exciton discrimination layer have succeeded in considerably increasing the water splitting activity.

The invention claimed is:

1. A method for producing a transparent electrode for oxygen production comprising a Ta nitride layer on a transparent substrate, comprising:
    forming a Ta nitride precursor layer comprising Tantalum on the transparent substrate; and
    nitriding the Ta nitride precursor layer with a mixed gas comprising ammonia and nitrogen gas,
    wherein
    a volume ratio of ammonia and nitrogen in the mixed gas is from 15:85 to 70:30.

2. The production method according to claim 1, wherein the Ta nitride layer is a $Ta_3N_5$ layer.

3. The production method according to claim 1, wherein the transparent substrate is a sapphire substrate or a $SiO_2$ substrate.

4. The production method according to claim 1, wherein a volume ratio of ammonia and nitrogen in the mixed gas is from 20:80 to 50:50.

* * * * *